June 27, 1961 P. S. VAN BAARN 2,990,077
CLOSURES
Filed May 10, 1957 4 Sheets-Sheet 1

Inventor:
Paul S. Van Baarn
by: Michael S. Striker

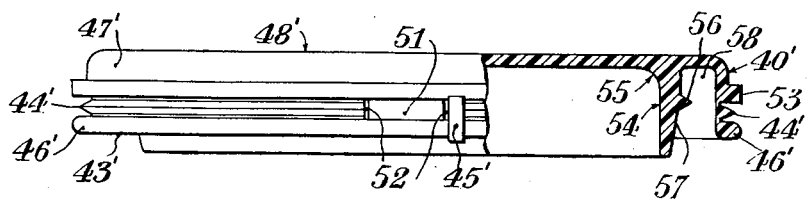
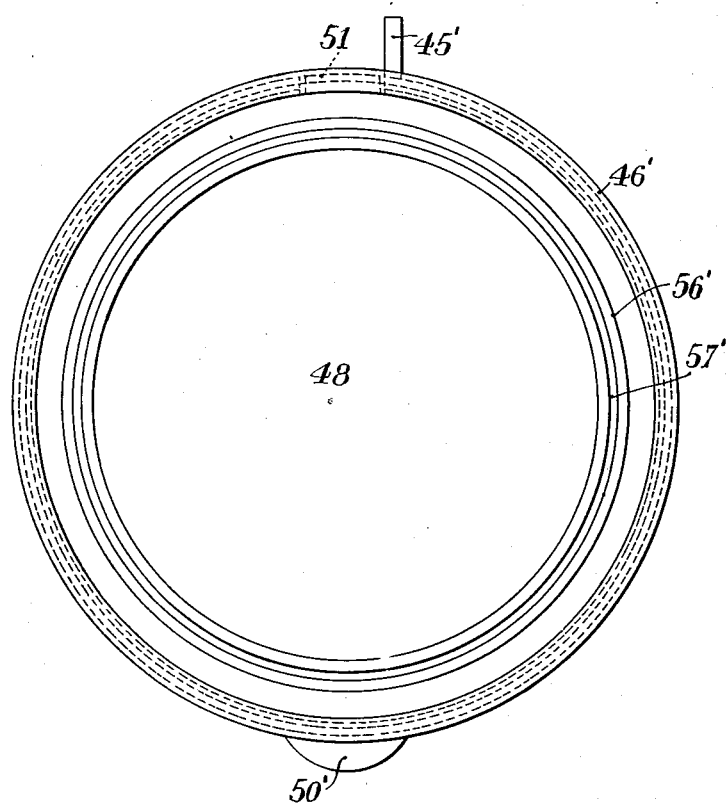

June 27, 1961　　　P. S. VAN BAARN　　　2,990,077
CLOSURES
Filed May 10, 1957　　　　　　　　　　　　4 Sheets-Sheet 3

Inventor:
Paul S. Van Baarn
By: Michael S. Striker

June 27, 1961 P. S. VAN BAARN 2,990,077
CLOSURES
Filed May 10, 1957 4 Sheets-Sheet 4

INVENTOR.
Paul S. Van Baarn
BY Michael S. Striker

United States Patent Office 2,990,077
Patented June 27, 1961

2,990,077
CLOSURES
Paul S. Van Baarn, 840 Madison Ave., New York, N.Y.
Filed May 10, 1957, Ser. No. 658,921
2 Claims. (Cl. 215—41)

The present invention relates to closure devices which are capable of being used on all types of containers such as bottles, jars, and the like.

The closure device of the present invention is formed from a single piece of molded plastic which is elastic, such as polyethylene, polystyrene, and a polyvinyl resin such as polyvinyl chloride. The plastic closure member is stretched so as to be applied to the container and to grip the latter resiliently, or because of the increased plasticity of the material of the closure device when it is heated, the device is heated and then is allowed to shrink onto a container so as to grip the latter elastically when the device reaches room temperature. Furthermore, the closure device of the present invention includes a tear means which is adapted to be torn away when it is desired to have access to the interior of a container provided with the device of the invention, this tear means when removed separating a skirt portion of the closure device which surrounds the container at the outlet thereof into a transverse closing wall and skirt portion connected thereto which are adapted to be raised from the container to give access to the interior thereof and into a lower skirt part in the form of a band resiliently gripping the container to remain thereon and to hold the device thereon.

The tear means can take the from, for example, of a relatively strong wire embedded within the wall of the skirt of the closure device during molding of the latter.

Closure devices of the above type have several advantages such as the ease of manufacture and use thereof, their low cost of manufacture, the ease with which they are applied to the containers in great numbers, as well as the seal which they provide as a result of the flexibility of the plastic material.

The present invention adds to the above advantages other important advantages such as the advantage of preventing loss of the closure device, by providing after the tear strip is removed from the device a band part which remains permanently on the container and resiliently grips the latter and which is connected in a permanent, flexible, durable manner to the remainder of the closure device which moves as a unit to and from a position closing the container which carries the device.

Thus, it is an object of the present invention to provide a device of this type where a skirt portion of the closure device is divided upon removing of a tear strip therefrom into a container-gripping band and into a transverse wall and skirt portion connected to the band by a part of the skirt portion which forms a hinge.

It has already been proposed to provide containers such as tin cans with a structure similar to that described above and made of metal, but with such structure the device is extremely complex and the hinge structure breaks very quickly after a small amount of usage thereof.

A further advantage of the plastic closure device of the present invention is that a simple portion of the plastic material can constitute a flexible and durable hinge.

A further object of the present invention is to provide a closure device of the above type which is capable of being automatically maintained in an open position during pouring of the contents of a container out of the latter, for example, so that the closure device will not automatically close itself as a result of the elasticity of the plastic material thereof. Where metal is used to form a hinge, for example, the rigidity of the metal is sufficient to maintain the closure device in an open position, but this rigidity on the other hand leads to breakage of the hinge connection after a short period of usage because of the deformation of the metal which occurs during each opening and closing of the container and because of the limited elasticity of the metal. This object of the invention is accomplished by providing the closure device of the invention with an abutment means which engages a part of the container when the closure device is in its open position so as to releasably maintain the closure device in its open position until the operator closes the closure device.

The skirt portion of the closure device of the present invention can include at the place where its hinge is located an elongated thicker portion extending beyond the bottom edge of the skirt portion of the closure device, and the part of this thicker portion which extends beyond the edge of the skirt portion is capable of being turned so as to be located beneath the flexible gripping band formed when the tear strip is removed, and in this way the portion of the hinge which extends beyond the skirt portion maintains the closure device in its open position and forms the abutment means referred to above.

The closure devices of the present invention and containers used therewith can have any desired configuration, such as circular, oval, polygonal, etc., and the closure device itself can be provided with any type of sealing structure which may be known per se.

For example, the closure device of the invention may be provided with a plug adapted to extend into the interior of a container so as to close the outlet thereof in a fluid-tight manner.

The skirt portion of the closure device of the invention can be provided with a lifting tab located above the tear strip at a point diametrically opposed from the hinge so as to facilitate opening of the closure device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a partly sectional elevational view of another embodiment of a closure device according to the present invention;

FIG. 5 is a bottom plan view of the device of FIG. 4 showing the construction of FIG. 4 as it appears from beneath;

Figure 1:
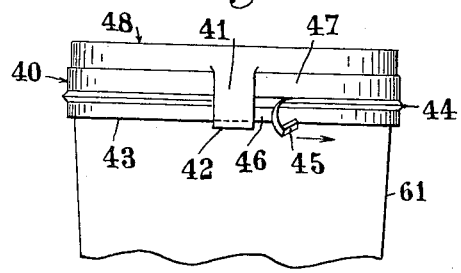
FIG. 1 is an elevational view of a closure device according to the present invention shown mounted on a container, FIG. 1 showing the closure device as seen when looking toward the hinge thereof.
Figure 2:
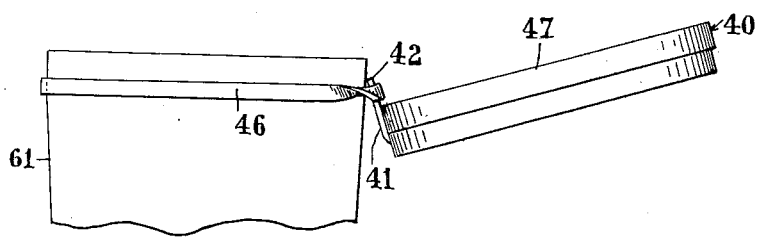
FIG. 2 shows in an elevational view the closure device of FIG. 1 after it has been turned to its open position.

Referring now to FIGS. 1 and 2 the closure device illustrated therein includes a transverse closing wall portion 48 formed integrally with a skirt portion 40, the wall portion 48 extending across and closing the outlet opening of the container 61 while the skirt portion 40 extends about and resiliently embraces the container 61 at its outlet opening. The entire closure device is made of a single piece of plastic material, as was pointed out above, and the body of plastic material is provided with an elongated axially extending thickened portion forming an elongated hinge 41 which extends at its bottom end 42 beyond the lower peripheral edge 43 of the closure device. A tear means is incorporated into this closure device, and this tear means is in the form of a wire 44 embedded peripherally in the skirt portion 40 between the free edge 43 thereof and the wall 48 during molding of the closure device, and the tear wire 44 extends about the skirt portion 40 from one side of the hinge 41 to the opposite side thereof, the wire 44 which may be covered with the plastic of the closure device terminating at the right side of the hinge 41, as is viewed in FIG. 1, in a tab projecting from the closure device so as to facilitate removal of the tear means 44.

After the closure device is molded it is applied to the container 61 either by being stretched onto the latter so as to resiliently grip the same or as by being heated so as to be rendered somewhat plastic and then placed on the container so as to shrink thereon during cooling. When it is desired to use the container the tab 45 is gripped and the tear strip 44 is removed so as to divide the skirt portion 40 into an upper skirt part 47 and a lower skirt part 46. When the tear strip is removed all that interconnects the upper and lower skirt parts 47 and 46 is the hinge 41. The lower skirt part 46 forms an elastic band gripping the container 61 while the upper skirt part 47 resiliently embraces the container 61 at the upper outlet end thereof, and of course the closing wall portion 48 which is connected integrally at its periphery with the skirt portion 47 serves to close the outlet opening of the container 61. In order to open the closure device after the tear strip has been removed therefrom the skirt porion 47 is lifted at a part thereof directly opposite the hinge 41 so that the skirt portion 47 together with the closure wall 48 and a part of the hinge 41 form a unit which is tiltable between a position closing the container 61 and a position opening the container 61, this latter position being shown in FIG. 2.

When the closure device is located in the open position indicated in FIG. 2, it will be noted that the projecting portion 42 of the hinge 41 extends upwardly and the portion 42 of the hinge 41 is located beneath the band 46 which has been twisted, so as to resiliently hold the hinge 41 in the position shown in FIG. 2 and thus the portion 42 of the hinge 41 forms an abutment means engaging the container 61 to releasably maintain the closure device in its open position, as is shown in FIG. 2. When it is desired to close the container 61, it is only necessary for the operator to tilt the turnable unit back to the position of FIG. 1.

Figure 3:
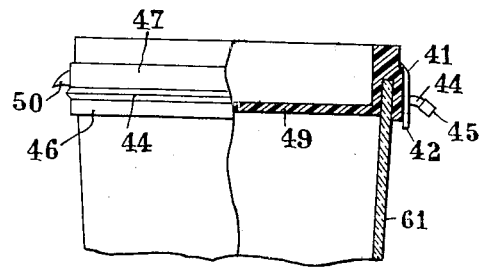
FIG. 3 is a partly sectional elevational view of a modification of the closure device of FIG. 1 according to which the closure device is provided with a plug which extends into the container.

The construction shown in FIG. 3 is identical with that of FIGS. 1 and 2 except that instead of a transverse closing wall 48 the closure device is provided with a transverse wall 49 forming together with an upwardly extending annular wall portion a plug insertable into the container 61 in order to close the latter in a fluid-tight manner. The upwardly extending annular wall portion which extends from the periphery of the transverse wall 49 forms with the outer skirt portion 47 an annular groove receiving the upper rim of the container 51, as is evident from FIG. 3. Furthermore, the embodiment shown in FIG. 3 is provided at a part of the skirt portion 47 diametrically opposed from the hinge 41 with a lifting tab 50 which is integral with the skirt portion 47 and which is located above the tear strip 44.

Figure 10:
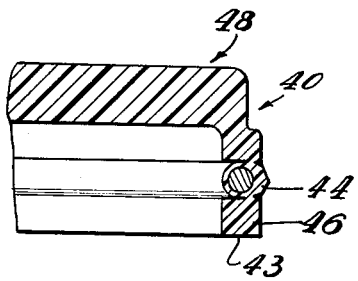
FIG. 10 is a fragmentary sectional elevational view showing how the tear means of the embodiment of FIG. 1 is constructed.

As may be seen from FIG. 10, the tear strip 44 is in the form of a wire embedded within the plastic material of the closure device and covered with only a light thickness of the plastic material, the portion of the plastic material which surrounds the wire being of an extremely thin cross section at its edges which are respectively joined to the skirt portion 47 and the elastic band 46. Thus, when the wire is torn from the closure device the wire is removed with a covering of plastic material.

According to the embodiment of the invention which is illustrated in FIGS. 4 and 5, the hinge 51 interconnects the skirt portion 47' with the container-gripping band 46' the latter being in the form of a relatively thick annular member, and this hinge portion 51 is not thicker than the adjoining parts of the closure device and does not extend downwardly beyond the bottom edge 43' of the skirt portion 40' of the closure device.

With this embodiment there is provided between the skirt portion 47' and the band portion 46' a tear strip in the form of an elongated rib 44' which is joined integrally with the upper and lower skirt portions 47' and 46', respectively, by weakened portions of the material in the form of portions of greatly reduced thickness so that the tear strip 44' can easily be torn from the device, this tear strip terminating at one side of the hinge 51 is an elongated tab 45' which is capable of being gripped by the user. The tear strip 44' extends almost completely around the closure device but terminates short of the hinge 51 so as to form with the latter a pair of small openings 52.

The hinge portion 51 is relatively thin and thus is flexible enough to provide the desired tilting movement of the unit formed by at least part of the hinge portion 51 together with the transverse closing wall portion 48' and the skirt portion 47', after the tear strip 44' is removed. Because of the flexibility of the plastic material there is no danger of rapid wear of the hinge with resulting breakage thereof, as is the case with metal.

At the bottom periphery of the skirt portion 47' the embodiment of FIG. 4 is provided with an outwardly extending annular flange 53 which facilitates mechanical mounting of the closure device on a container such as a preserve jar. At a point diametrically opposed from the hinge 51 the flange 53 is enlarged to provide an integral lifting tab 50' in order to facilitate opening of the closure device.

This embodiment of the invention is provided with an annular plug portion 54 integral with the transverse wall 48' and molded at the same time that the entire one-piece closure device is molded. This plug 54 is thickest at the portion 55 thereof which is located directly next to the wall 48' and becomes gradually thinner toward its bottom free edge which extends downwardly beyond the container-gripping band 46'. It will be noted from FIG. 4 that the outer surface 57 of the annular plug 54 forms part of a cone and is inclined inwardly toward the interior of the container. This inclination facilitates the entry of the plug 54 into the mouth of the container. Furthermore, it will be noted that the plug 54 is provided with an annular rib 56 directed outwardly toward the skirt portion 40' and serving to provide a sealed engagement between the plug 54 and the container. The annular plug 54 defines with the skirt portion 40' an annular groove 58 which receives the container wall which defines the outlet of the container, and the size of the groove 58 is designed so as to match properly with the thickness of the wall of the container and with the diameter thereof.

Figure 8:
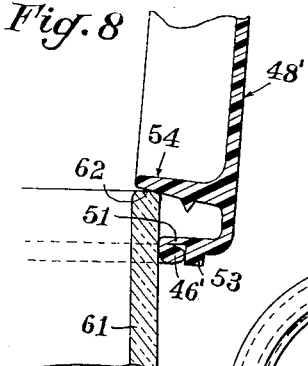
FIG. 8 shows how the closure device of FIGS. 4 and 5 cooperates with the container and in particular shows how the central plug of the closure device forms a means for maintaining the closure device releasably in its open position.

As may be seen from FIG. 8, which shows the structure of FIGS. 4 and 5 after the tear strip has been removed and when the tiltable unit form by wall 48', skirt portion 47', and hinge 51 is tilted to its open position, the plug 54 engages the upper periphery 62 of the container 61 so as to form an abutment means which yieldably and releasably maintains the device in the open position thereof shown in FIG. 8, so that the plug 54 not only serves to seal the container but also to provide a means for releasably holding the closure device in its open position.

Figure 6:
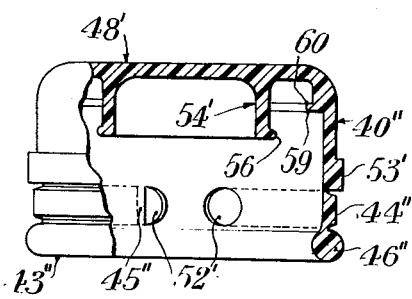
FIG. 6 is a partly sectional elevational view of another embodiment of a closure device according to the present invention.
Figure 7:
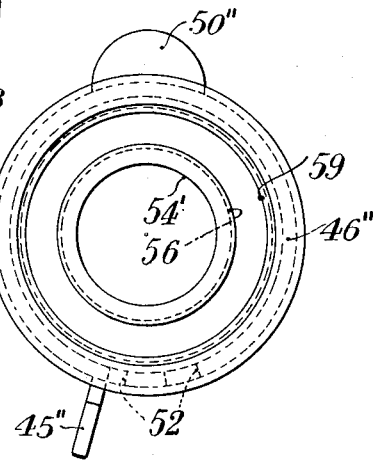
FIG. 7 is a bottom plan view of the structure of FIG. 6.

FIGS. 6 and 7 show an embodiment of a closure device according to the present invention which is adapted to be used for bottles, for example. This embodiment includes a transverse closing wall 48' which is joined at its periphery integrally with a skirt portion 40" which is adapted to surround the container and to resiliently engage the same. The skirt portion 40' includes an upper skirt part which terminates at its bottom end in an outwardly extending rib 53' which facilitates mechanical placing of the closure device on the container. Between the lower skirt portion 46" which forms an elastic band resiliently gripping the container to maintain the closure device thereon and the upper skirt part there is located a tear strip 44' connected integrally with the remainder of the closure device by a pair of elongated weakened portions formed by parts of the wall having an extremely reduced thickness, as is evident from FIG. 6. At the ends of the tear strip 44' the closure device is provided with a pair of openings 52' located at opposite ends of a part of the wall of the skirt portion which forms a hinge similar to the hinge 51 described above. Furthermore, the tear strip 44" terminates at one end in a tab 45" which facilitates removal of the tear strip so as to divide the strip portion 40' into upper and lower parts as described above. Moreover, the rib 53' is formed integrally with a lifting tab 50" (FIG. 7) which is located at a diametrically opposed part of the device from the hinge thereof.

As is apparent from FIGS. 6 and 7 this embodiment of the invention is also provided with a closure plug 54' which extends into the interior of the container so as to seal the latter and which defines with the skirt portion 40' an annular groove adapted to receive a part of the container. The skirt portion 54' does not extend down to the elevation of the rib 53', and furthermore it terminates at its bottom end in an outwardly directed sealing rib 56. Moreover, the skirt portion 40' is provided at its interior with an annular shoulder 59 and at the shoulder the skirt portion 40" is provided with an inwardly extending annular rib 60 which also engages the container so as to seal up the latter when the closure device is in its closed position.

With the embodiment of FIGS. 6 and 7, as with the embodiment of FIGS. 4 and 5, when the closure device is in an open position similar to that shown in FIG. 8 the plug 54' of the embodiment of FIGS. 6 and 7 will also engage a part of the container so as to maintain the closure device releasably in its open position, although when the plug 54' engages the container the wall 48" may not extend straight up as shown in FIG. 8. This wall will be inclined to the vertical but will not in any way interfere with the pouring of the contents of the container from the interior thereof.

Figure 13:
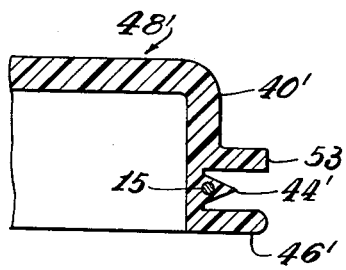
FIG. 13 is a fragmentary sectional elevational view of the embodiment of FIG. 4 showing a wire embedded in the tear strip thereof.

FIG. 13 of the drawings fragmentarily illustrates a closure device identical with that of FIG. 4 except that it is not provided with an inner plug and in the embodiment of FIG. 13 the tear strip 44' has a wire 55 embedded in its interior to lend rigidity thereto.

Figure 9:
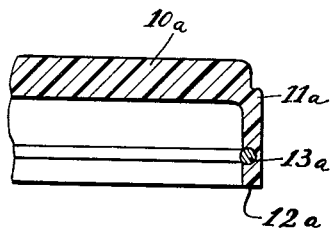
FIG. 9 is a fragmentary sectional elevational view showing a tear strip means in the form of a wire embedded in a closure device of the invention.

FIG. 9 of the drawings shows a closure device similar to that of FIG. 1 where a wire 13a is embedded in the skirt portion of the closure device between the upper skirt part 11a and the lower skirt part 12a. This closure device is provided with an upper closing wall 10a. The wire 13a has a part of its inner peripheral surface exposed at the interior of the closure device, and a free end of the wire extends from the exterior of the closure device on one side of the hinge, the other end of the wire terminating on the opposite side of the hinge. Thus, when the operator tears the wire 13a from the device he will tear through the plastic so as to separate in this way the upper and lower skirt portions 11a and 12a respectively from each other.

Figure 11:
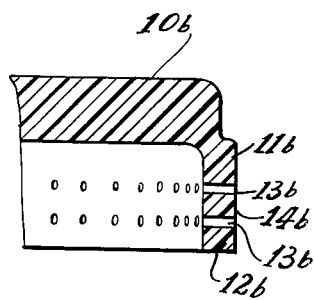
FIG. 11 is a fragmentary sectional elevational view showing a closure device of the invention provided with a pair of weakened portions defining a tear strip between themselves.

According to the embodiment of the invention which is illustrated in FIG. 11, the closure device has a skirt portion of uniform thickness extending integrally from the closing wall portion 10b. This skirt portion has an upper skirt part 11b and a lower gripping band part 12b. The closure device is formed during molding with two rows of openings 13b which thus provide the closure device with a pair of elongated weakened portions corresponding to the weakened portions of the embodiments described above. Thus, the rows of openings 13b define between themselves a tear strip 14b, and this tear strip is formed with an integrally extending tab extending from the closure device to facilitate gripping of the tab and to facilitate removal of the tear strip. Of course the two rows of openings 13b terminate on opposite sides of a hinge which is simply formed by a portion of the skirt extending between and integrally formed with the portions 11b and 12b thereof.

Figure 12:
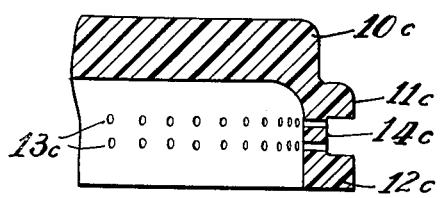
FIG. 12 is a fragmentary sectional elevational view showing a slight variation of the construction of FIG. 11.

The embodiment of FIG. 12 is identical with that of FIG. 11 and has the corresponding parts indicated by the same numerals followed by the letter c. With this embodiment the only difference is that the wall portion of the skirt between the parts 11c and 12c thereof is of reduced thickness, this wall portion being located between the two rows of openings 13c. Thus, with this embodiment the tear strip is thinner than with the embodiment of FIG. 11.

Figure 14:
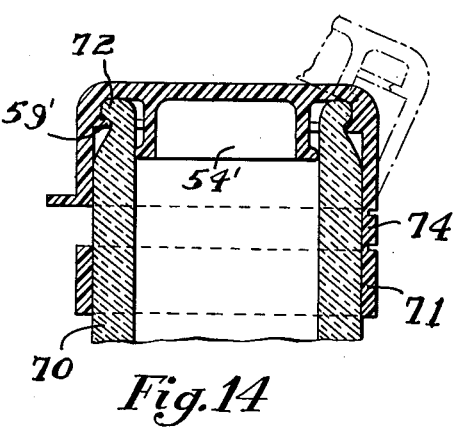
FIG. 14 shows an embodiment similar to FIG. 6 mounted on the outlet of a container.

FIG. 14 of the drawings shows a closure on the neck of the bottle 70. This closure is identical with that of FIG. 6 except that the closure of FIG. 14 has a container gripping band 71 at its bottom end rather than the ring 46 of FIG. 6 which is of circular cross section. The closure is shown in FIG. 14 after the tear strip has been removed. It will be noted that the container 70 terminates at its top end in a bead 72. The outer diameter of the bead 72 is greater than the inner diameter of the lip 59' when this lip is unstressed.

As is clearly apparent from FIG. 14, the container 70 remains closed and has its interior fluid tightly sealed off from the outer atmosphere even after the tear strip is removed. The interior of the container 70 is only opened when the closure is moved to the open position indicated in dot-dash lines in FIG. 14. It will be noted that when the closure is in the open position, the plug 54' engages the top rim of the container to prevent the closure from being returned to its closed position due to the resilient force of the material of the hinge 74, which is identical with the hinge 44.

When the user presses in the closure to return it to its closed position, the lip 59' snaps over the bead 72 and the interior of the container is again sealed from the outer atmosphere in a fluid-tight manner while the closure is in its closed position.

Thus, with the closures of the present invention, the container is sealed even after the tear strip is removed and until the container is opened. The container is again sealed when the closure is returned to its closed position.

It will be understood that each of the elements described above, or two or more together, may also find a useful application in other types of the closure devices differing from the types described above.

While the invention has been illustrated and described as embodied in plastic closure devices adapted to remain permanently on a container, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for the various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A closure piece for a container having an opening comprising a single-piece cap member made of non-metallic resilient material comprising a closing wall portion, a skirt portion extending in a plane at substantially right angles thereto and connected to the periphery of said closing wall portion extending away from said closing wall portion by an amount to form a closing lip engageable with the container, said skirt including an upper skirt portion having an internal inwardly directed annular rib engageable with said container in tight closing engagement, an intermediate tear-strip and hinge portion and a lower skirt portion, said lower skirt portion being connected to said upper skirt portion by said hinge portion and said tear strip, said upper skirt portion having an external outwardly extending finger engaging edge portion substantially opposite said hinge portion, an internal skirt portion connected to said closing wall portion and extending substantially parallel to, but spaced inwardly from said first named skirt portion, but being shorter than said first named skirt portion, and said internal skirt having an outwardly extending annular sealing rib located in opposed relation to said first named rib, said tear-strip portion being capable of being torn outwardly to define a space between said upper and lower portions except in the area of said hinge portion thereby providing a hinged closure piece.

2. A closure piece according to claim 1 wherein said inner skirt portion extends below said inner annular rib to define a closure piece guiding element.

References Cited in the file of this patent

UNITED STATES PATENTS

| | | |
|---|---|---|
| 1,958,466 | Boyd | May 15, 1934 |
| 2,102,440 | Sebell | Dec. 14, 1937 |
| 2,231,779 | Swartzel | Feb. 11, 1941 |
| 2,289,424 | Hodgson | July 14, 1942 |
| 2,340,568 | Sebell | Feb. 1, 1944 |
| 2,406,568 | Sebell | Aug. 27, 1946 |
| 2,751,102 | Kihm | June 19, 1956 |
| 2,814,404 | Towns | Nov. 26, 1957 |

FOREIGN PATENTS

| | | |
|---|---|---|
| 698,992 | Great Britain | Oct. 28, 1953 |
| 1,000,252 | Germany | Jan. 3, 1957 |